United States Patent
Faisal Mahafdhah

(10) Patent No.: US 12,323,542 B2
(45) Date of Patent: Jun. 3, 2025

(54) ELECTRONIC DEVICE WITH SYMMETRICAL DISPLAY SCREENS AND REVERSIBLE CAMERA

(71) Applicant: Mohammad Faisal Mahafdhah, Dubai (AE)

(72) Inventor: Mohammad Faisal Mahafdhah, Dubai (AE)

( * ) Notice: Subject to any disclaimer, the term of this patent is extended or adjusted under 35 U.S.C. 154(b) by 335 days.

(21) Appl. No.: 17/698,616

(22) Filed: Mar. 18, 2022

(65) Prior Publication Data

US 2022/0337686 A1    Oct. 20, 2022

Related U.S. Application Data

(60) Provisional application No. 63/177,139, filed on Apr. 20, 2021.

(30) Foreign Application Priority Data

Jun. 21, 2021  (CN) .......................... 202121331536.3
Feb. 21, 2022  (KR) ......................... 20-2022-0000480

(51) Int. Cl.
   *H04M 1/02*     (2006.01)
(52) U.S. Cl.
   CPC ....... *H04M 1/0264* (2013.01); *H04M 1/0266* (2013.01)
(58) Field of Classification Search
   CPC ............ H04M 1/0266; H04M 2250/16; G06F 1/1692
   See application file for complete search history.

(56) References Cited

U.S. PATENT DOCUMENTS

| 8,571,605 | B2 * | 10/2013 | Park | G06F 1/3203 455/574 |
|---|---|---|---|---|
| 2008/0090618 | A1 * | 4/2008 | Lim | G06F 1/1686 455/566 |
| 2010/0045621 | A1 * | 2/2010 | Kang | G06F 3/0486 345/173 |
| 2010/0048190 | A1 * | 2/2010 | Park | H04M 1/57 345/173 |
| 2010/0048194 | A1 * | 2/2010 | Park | G06F 1/1626 455/418 |
| 2014/0285476 | A1 * | 9/2014 | Cho | H04M 1/0268 345/204 |
| 2014/0375219 | A1 * | 12/2014 | Lee | H04M 1/22 315/153 |
| 2017/0041035 | A1 * | 2/2017 | Chen | H04W 52/283 |
| 2018/0356904 | A1 * | 12/2018 | Disano | G06F 3/0488 |
| 2019/0042066 | A1 * | 2/2019 | Kim | H04M 1/725 |
| 2019/0121396 | A1 * | 4/2019 | Ha | H01Q 1/44 |

(Continued)

*Primary Examiner* — Rockshana D Chowdhury
*Assistant Examiner* — Douglas R Burtner
(74) *Attorney, Agent, or Firm* — Hayes Soloway P.C.

(57) ABSTRACT

There is disclosed an electronic device comprising at least two symmetrically positioned display screens on a first and second face of the electronic device, and at least two cameras, wherein a front camera for the first face functions as a rear camera for the second face, and a front camera for the second face functions as a rear camera for the first face of the electronic device. The symmetrically positioned display screens on the first and second faces of the electronic device are controlled and operatively connected to a plurality of independent electronic processing components.

13 Claims, 6 Drawing Sheets

(56) References Cited

U.S. PATENT DOCUMENTS

| | | | |
|---|---|---|---|
| 2019/0253541 A1* | 8/2019 | Fan | H04M 1/0264 |
| 2021/0216104 A1* | 7/2021 | Huang | G06F 1/1641 |
| 2022/0291829 A1* | 9/2022 | Kim | G06F 1/165 |
| 2022/0300234 A1* | 9/2022 | Nomiso | H04N 23/633 |
| 2022/0321691 A1* | 10/2022 | Yao | H04M 1/72436 |
| 2022/0413787 A1* | 12/2022 | Yu | G06F 1/1641 |

* cited by examiner

ELECTRONIC DEVICE WITH SYMMETRICAL DISPLAY SCREENS AND REVERSIBLE CAMERA

CROSS-REFERENCE TO RELATED APPLICATIONS AND PRIORITY

This patent application claims priority from Chinese Patent Application No. 202121331536.3 filed Jun. 16, 2021 and Korean Patent Application No. 2020220000480 filed Feb. 21, 2022, both of which claim priority from U.S. Provisional Patent Application No. 63/177,139 filed Apr. 20, 2021. Each of these patent applications are herein incorporated by reference in their entirety.

FIELD OF THE INVENTION

The present invention relates to a double faced electronic device, and particularly a double faced electronic device with reversible camera and screens on both faces functioning independent of each other.

BACKGROUND OF THE INVENTION

Background description includes information that may be useful in understanding the present invention. It is not an admission that any of the information provided herein is prior art or relevant to the presently claimed invention, or that any publication specifically or implicitly referenced is prior art.

The use of electronic devices or mobile phones has exponentially increased in recent times and are used for a variety of purposes, including communication, entertainment, browsing, for conducting business, and in case of an emergency. Some people carry more than one mobile phone for different purposes, such as for business and personal use. However, the traditional and widely used smartphone includes a single display screen.

Although smartphones or electronic devices have the option of inserting more than one SIM cards, a user needs to switch between the different applications, type messages or emails, answer various calls (regardless of being personal or work related) using a single and same display screen. This leads to poor user experience and fails to conveniently meet the user's requirement via the electronic device—to seamlessly transition between various roles in life. Further, owing to a lack of a proper division between personal data and work related data and connections, personal data may accidentally be shared on a work email, or work related chat application, resulting in leak of privacy.

In order to avoid such an inconvenience and in order to have a proper distinction between personal data and work data—users traditionally choose to use different devices for personal use and business use. This leads to having the users carry around multiple electronic devices wherever they commute, needing to check various devices on and off for viewing updates or notifications—which is overall inconvenient and troublesome especially when in rush, or during routine or daily hassles.

Therefore, there exists a need for a solution for the above listed drawbacks associated with traditional electronic devices, and which proves to be a remedy for the same.

SUMMARY OF THE INVENTION

Therefore it is an object of the present invention to propose a double faced electronic device with screens on both faces (symmetrical display screens) and functioning independent of each other, and a reversible camera.

In an aspect of the invention, an electronic device is disclosed comprising at least two symmetrically positioned display screens on a first and second face of the electronic device, and at least two cameras, wherein a front camera for the first face functions as a rear camera for the second face, and a front camera for the second face functions as a rear camera for the first face of the electronic device.

In an embodiment of the present invention, the symmetrically positioned display screens on the first and second faces of the electronic device are controlled and operatively connected to a plurality of independent electronic processing components.

In another embodiment of the present invention, the first face of the electronic device is operatively connected with a first baseband module in connection with a first connectivity module and a first memory module.

In another embodiment of the present invention, the first face of the electronic device is further connected to a first SIM interface, a first RF transceiver, a first RF switch and a first antenna.

In another embodiment of the present invention, the first face of the electronic device further comprises a first speaker connected with a first user interface module, a first audio module and a first microphone.

In another embodiment of the present invention, the second face of the electronic device is operatively connected with a second baseband module in connection with a second connectivity module and a second memory module.

In another embodiment of the present invention, the second face of the electronic device is further connected to a second SIM interface, a second RF transceiver, a second RF switch and a second antenna.

In another embodiment of the present invention, the second face of the electronic device further comprises a second speaker connected with a second user interface module, a second audio module and a second microphone.

In another embodiment of the present invention, the symmetrically positioned display screens on the first and second faces of the electronic device share information wirelessly.

In another embodiment of the present invention, the symmetrically positioned display screens on the first and second faces of the electronic device are controlled using a single processor.

In another embodiment of the present invention, the symmetrically positioned display screens on the first and second faces of the electronic device are powered using a single battery.

In another embodiment of the present invention, the battery is a high capacity battery of minimum 5000 mAh (milliampere-hour)

In another embodiment of the present invention, the symmetrically positioned display screens on the first and second faces of the electronic device are charged via a single charging port.

In another embodiment of the present invention, the symmetrically positioned display screens on the first and second faces of the electronic device are operated simultaneously by a user.

In another embodiment of the present invention, a plurality of front cameras on the first face functions as a plurality of rear cameras for the second face, and a plurality of front camera for the second face functions as a plurality of rear camera for the first face of the electronic device.

BRIEF DESCRIPTION OF THE DRAWINGS

The subject matter that is regarded as the invention is particularly pointed out and distinctly claimed in the claims at the conclusion of the specification. The foregoing and other aspects, features, and advantages of the invention are apparent from the following detailed description taken in conjunction with the accompanying drawings in which:

DETAILED DESCRIPTION OF THE INVENTION

The aspects of a double faced electronic device with screens on both faces (symmetrical display screens) functioning independent of each other and a reversible camera, according to the present invention will be described in conjunction with FIGS. 1A-4B. In the Detailed Description, reference is made to the accompanying figures, which form a part hereof, and in which is shown by way of illustration specific embodiments in which the invention may be practiced. It is to be understood that other embodiments may be utilized and logical changes may be made without departing from the scope of the present invention. The following detailed description, therefore, is not to be taken in a limiting sense, and the scope of the present invention is defined by the appended claims.

The present invention proposes a double faced electronic device with display screens on both faces (on either side of the electronic device) functioning independent of each other. Both of the display screens (first and second screens) function independent of each other, however sharing one battery.

In an embodiment of the present invention, the proposed double faced electronic device with symmetrical display screens and a reversible camera comprises independent sets of internal processing electronic components, SIM card, communication line and/or memory cards present for each screen of the device—which do not interfere with each other. Also, each screen of the electronic device is linked with a single phone number (SIM card and associated phone book), social media account and gallery. Thereby, as a result of this feature, a first face of the electronic device may be used for a first phone number and associated e-mail account, social media account and image gallery, whereas a second face of the electronic device may be used for a second phone number and associated e-mail account, social media account and image gallery, both the first and second faces operating independent of each other. In a preferable embodiment of the present invention, both the first and second screens (symmetrical display screens) are capable of sharing information wirelessly (for example, via Bluetooth).

In another preferred embodiment of the present invention, a front camera for the first face of the device will function as a rear/back camera for the second face of the device and vice versa. The electronic device includes, but is not limited to, a portable electronic device, a handheld computer, a tablet computer, laptop computer, a mobile phone, a digital watch or other "wearables", a media player, a personal digital assistant (PDA), or the like.

Figure 1A:
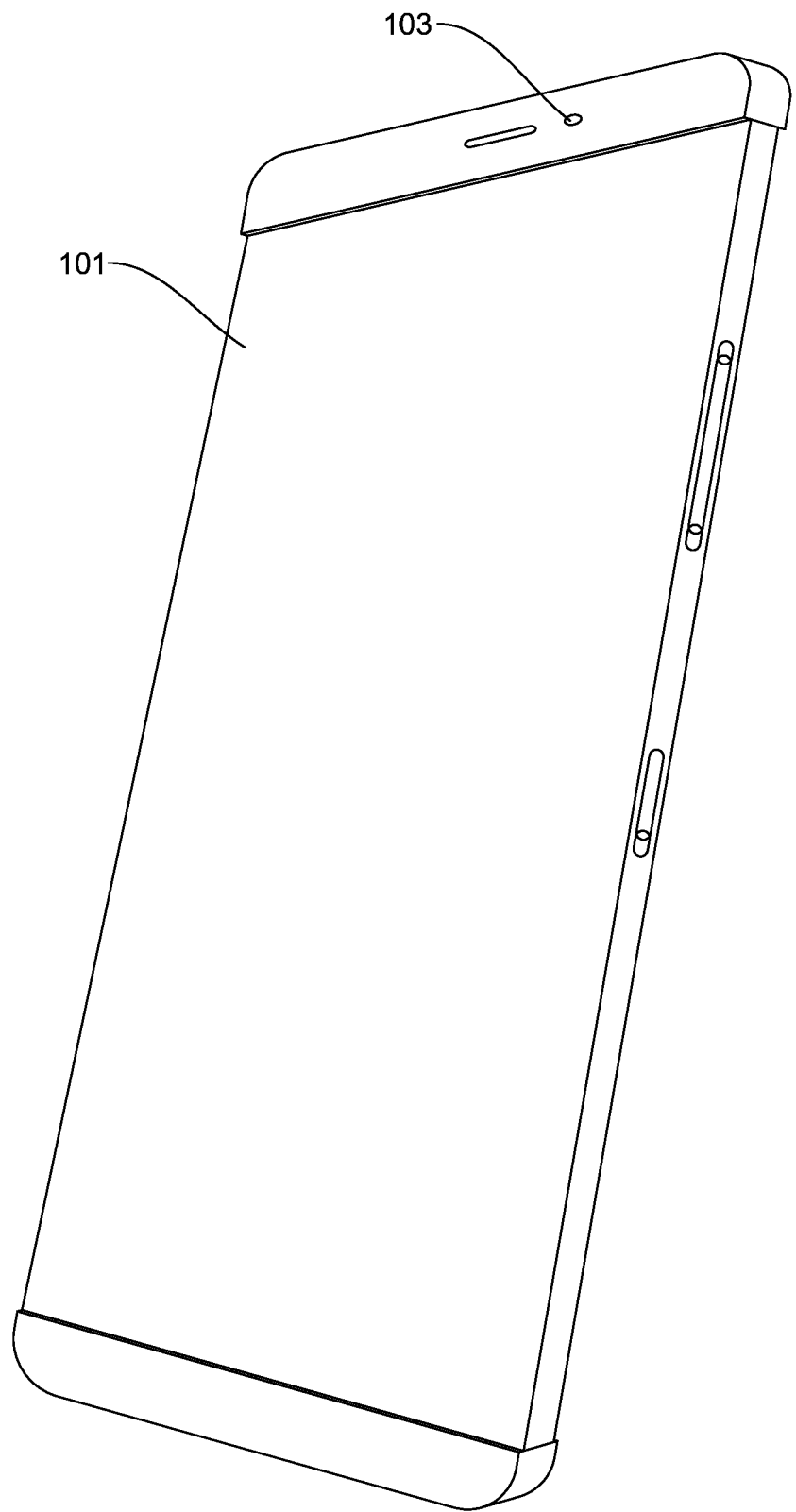
FIGS. 1A and 1B are perspective views of first and second symmetrical display screens of the proposed double faced electronic device, in accordance with the present invention.
Figure 1B:
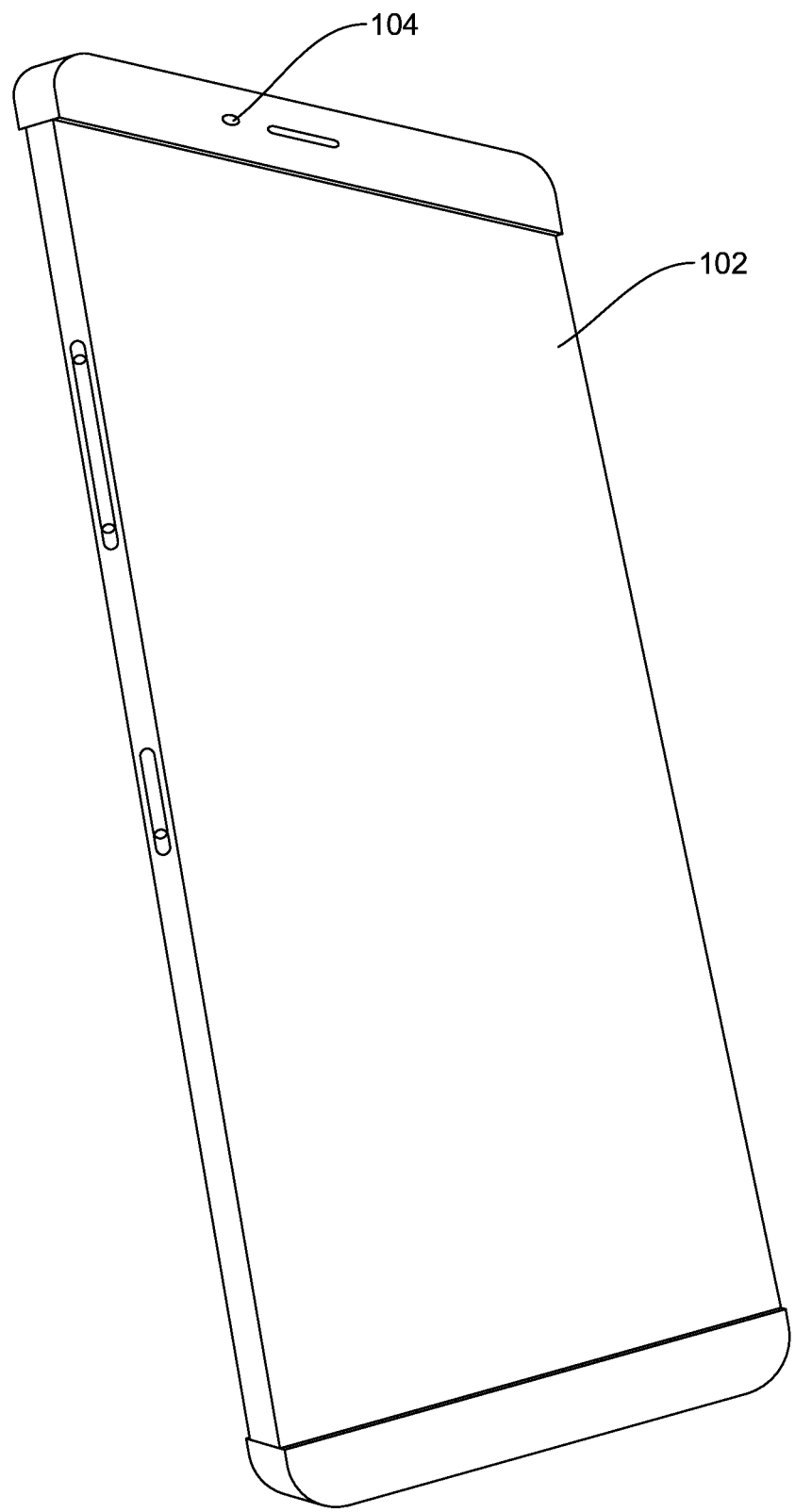

As shown in FIGS. 1A and 1B, the proposed invention discloses a double faced electronic device 100, with a display screen present on both a first and second face of the electronic device (101 and 102, respectively), both the first and the second faces or display screens being controlled by independent sets of internal processing electronic components such as a processor and, communication line and memory card. The user uses the first face of the electronic device as a first electronic device with its own contact number, phone book (or contact list), social media accounts and memory card and simultaneously can also operate on the second face of the electronic device as a second or separate electronic device with its own contact number, phone book (or contact list), social media accounts and memory card. 103 and 104 depict cameras on either faces of the proposed device.

Figure 2A:
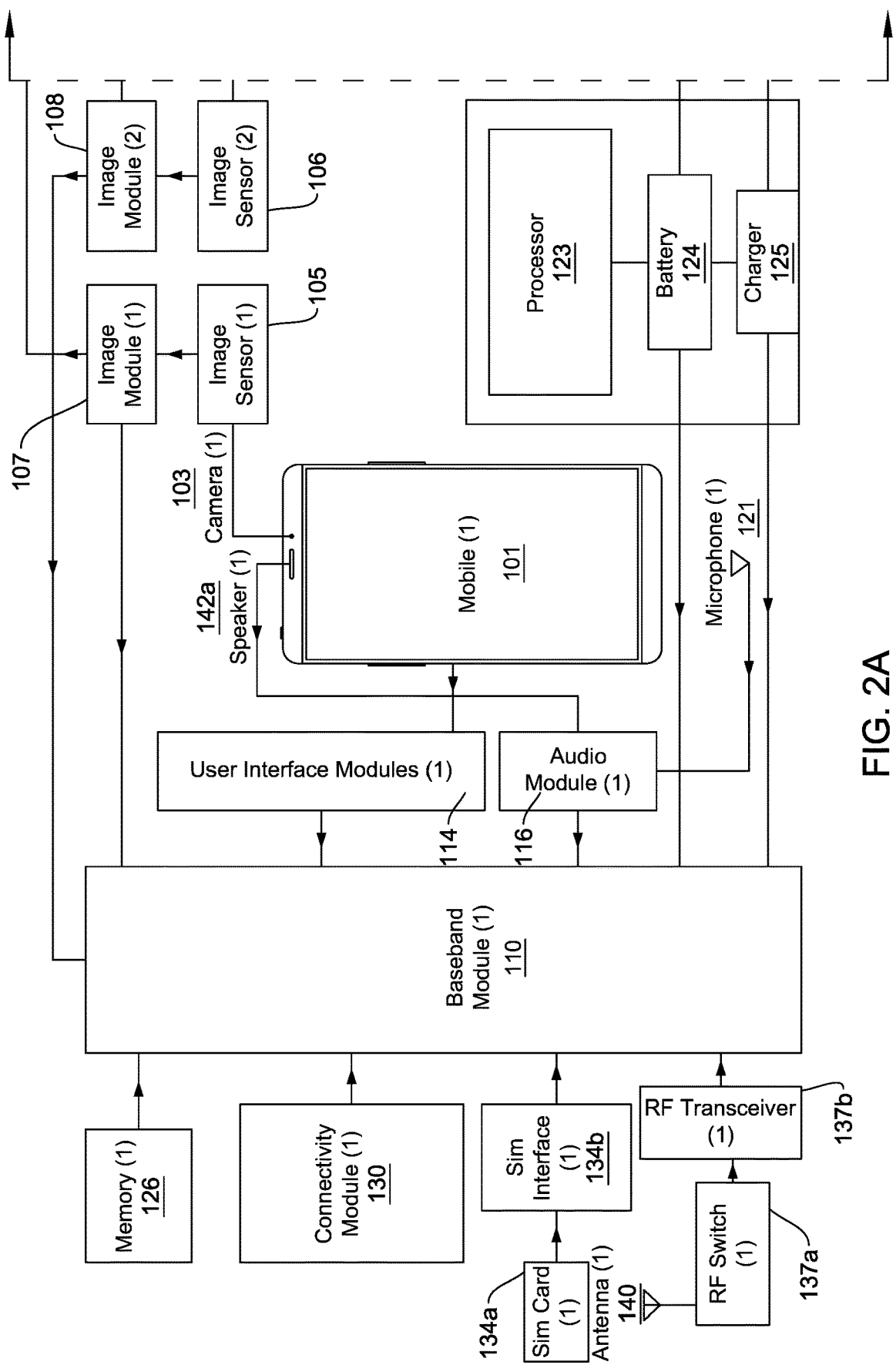
FIGS. 2A and 2B is a block diagram of internal electronic components of the first and second symmetrical display screens of the proposed double faced electronic device, in accordance with the present invention.
Figure 2B:
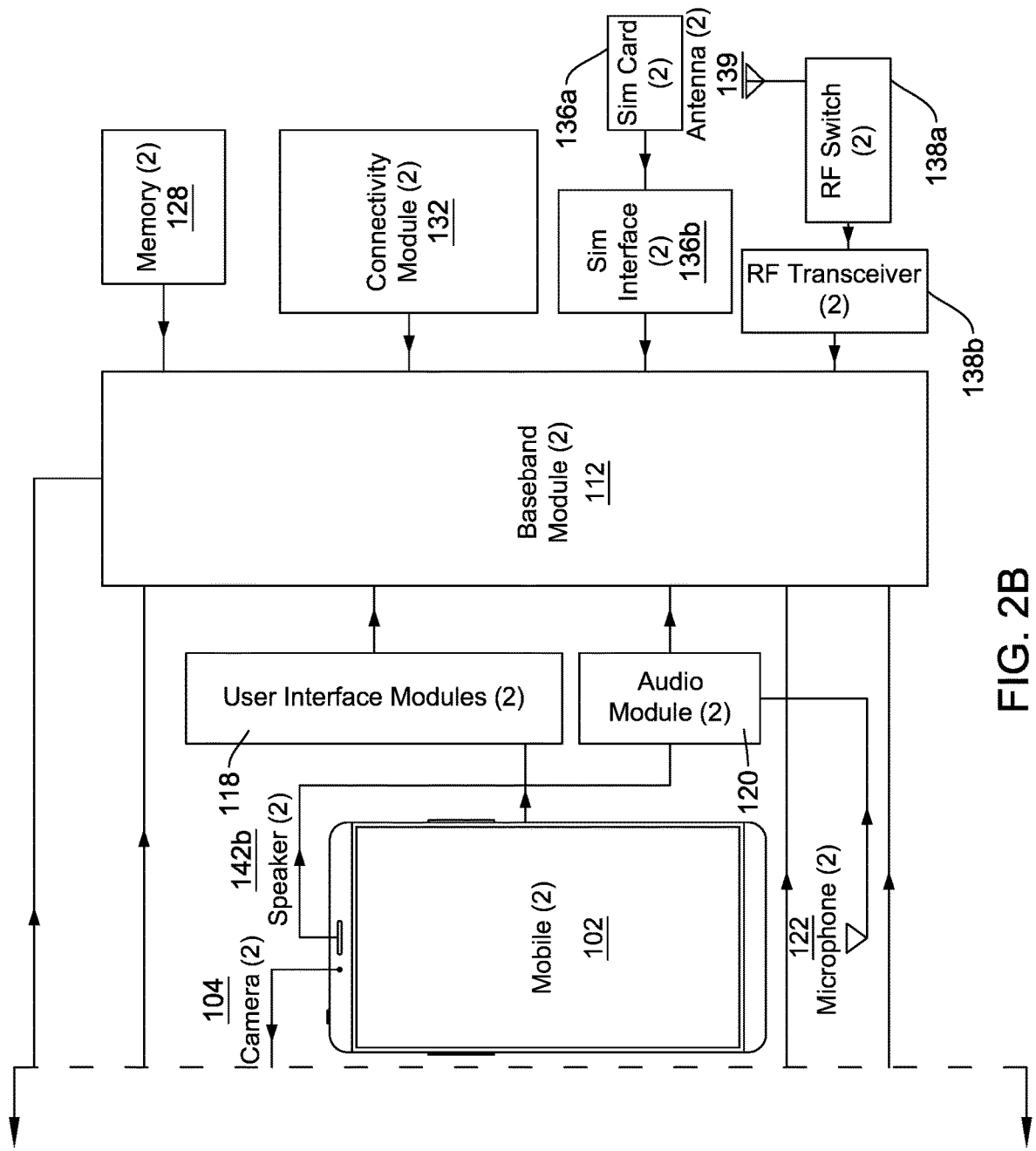

As shown in the block diagram of FIGS. 2A and 2B, the proposed double faced electronic device 100 comprises a first display screen 101 and a second display screen 102 positioned behind the first display screen 101. A first side of the electronic device comprises the first display screen 101, a first speaker 142a and camera 103 which is the front camera for the first display screen 101. The first speaker 142a is connected with a first user interface module 114, a first audio module 116 and a first microphone 121. Camera 104 acts as the rear camera for the first display screen 101. Camera 103 is operatively connected to a first image sensor 105 and a first image module 107. Further, the first display screen 101 is operatively connected with a first baseband module 110 which is in connection with a first connectivity module 130, a first memory module 126, a first SIM interface 134b and first SIM card 134a, a first RF transceiver 137b, a first RF switch 137a and a first antenna 140.

Further, a second side of the electronic device 100 comprises the second display screen 102, a second speaker 142b and camera 104 which is the front camera for the second display screen 102. The second speaker 142b is connected with a second user interface module 118, a second audio module 120 and a second microphone 122. Camera 103 acts as the rear camera for the second display screen 102. Camera 104 is operatively connected to a second image sensor 106 and a second image module 108. Further, the second display screen 102 is operatively connected with a second baseband module 112 which is in connection with a second connectivity module 132, a second memory module 128, a second SIM interface 136b and second SIM card 136a, a second RF transceiver 138b, a second RF switch 138a and a second antenna 139.

In an embodiment, each of the first display screen 101 and the second display screen 102 are provided with separate speakers (ultra-high quality 32 bit and DSD 64/128 audio playback). Further, separate digital microphones are connected with each of the first display screen 101 and the second display screen 102, capable of recording up to 120 dB SPL.

As a preferred embodiment of the present invention, both the first display screen 101 and the second display screen 102 are controlled via a single processor 123 and powered via a single battery 124 and a single charging port/slot 125.

The processor 123 and the battery 124 are capable of controlling and providing power and service time to both the first display screen 101 and the second display screen 102, even in situations where both the first display screen 101 and the second display screen 102 are being used simultaneously. In an embodiment, the battery 124 used is a high capacity battery of minimum 5000 mAh (milliampere-hour)—which provides sufficient power capable of supporting both the first display screen 101 and the second display screen 102 for a longest possible time.

In another embodiment, both the first display screen 101 and the second display screen 102 are touch-screens (including, but not limited to, resistive touch, surface capacitive, projected capacitive and SAW (Surface Acoustic Wave) touch screen). Both the first display screen 101 and the second display screen 102 receive inputs and function at the same time or at different times, based on the user's operations. The user can be watching a movie or listening to music on the first display screen 101, and can instantly flip the electronic device and use the second display screen 102 to answer a call or send a message. Another advantage of the proposed device is that photos, videos or chat history accessed using the first display screen 101 are not accessible by the second display screen 102, and thereby there is zero chance for data leakage or privacy-related issues.

In another embodiment, a plurality of cameras is present on the proposed device 100, wherein the plurality of cameras acting as front cameras for the first display screen 101 acts as rear cameras for the second display screen 102, and the plurality of cameras acting as front cameras for the second display screen 102 acts as rear cameras for the first display screen 101. Each camera has a resolution of minimum 32 megapixels with an f/2.2 aperture lens including a plurality of shooting modes and ability to record up to 4K 30 fps. In addition, wide-angle and high resolution aspects of the cameras offer a color tone which enables the camera to function as a selfie (front camera) and rear camera at the same time. In another embodiment of the present invention, the user can switch off any one of the display screens (101 or 102) if the user does not wish to use the particular screen for a certain amount of time.

Figures 3A, 3B:
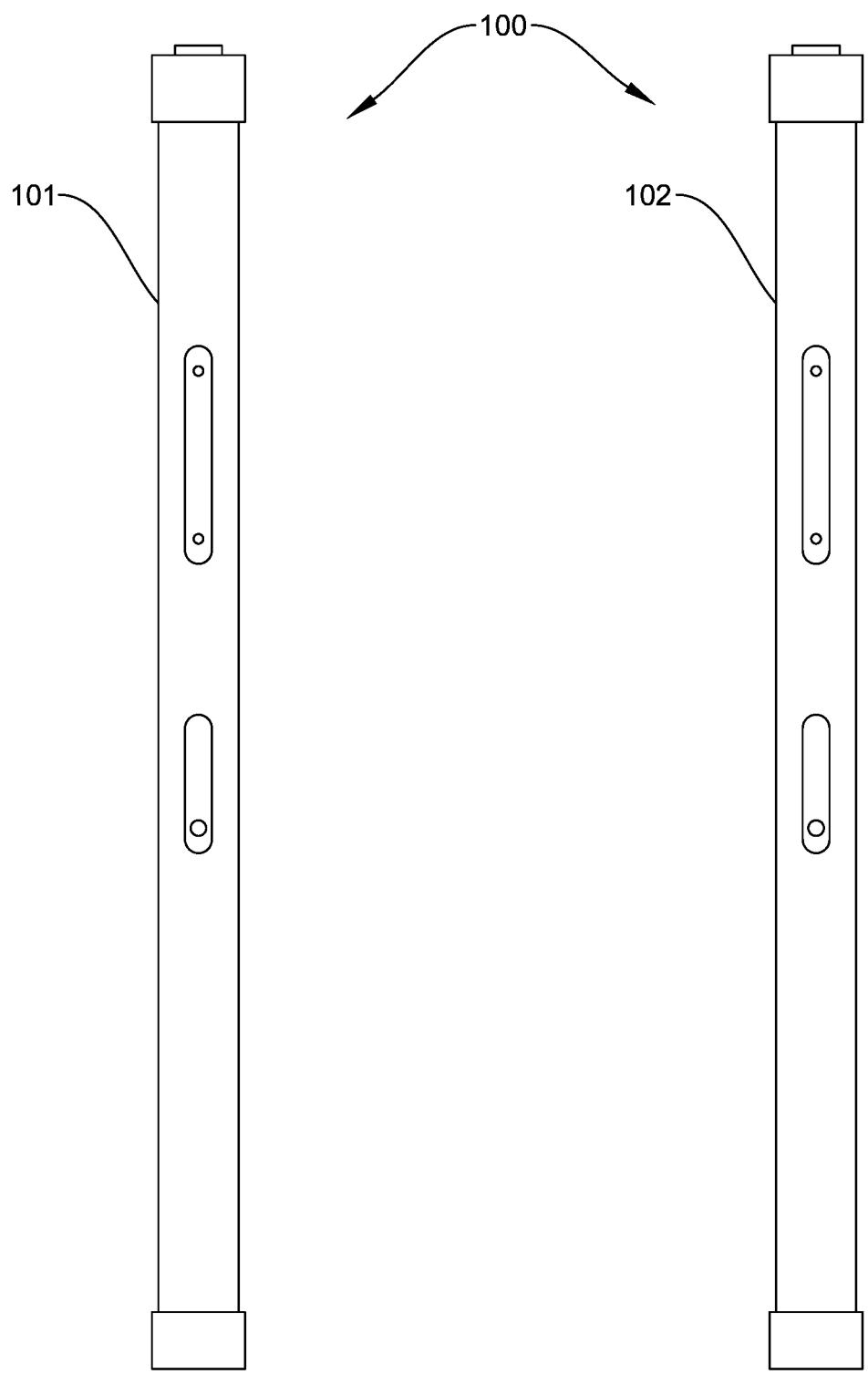
FIGS. 3A and 3B are perspective views of the side views (left and right sides) of the proposed double faced electronic device, in accordance with the present invention.

FIGS. 3A and 3B are perspective views of the side views (left and right sides) of the proposed double faced electronic device 100, in accordance with the present invention.

Figure 4A:
FIGS. 4A and 4B are perspective views of top and bottom views of the proposed double faced electronic device, in accordance with the present invention.
Figure 4B:
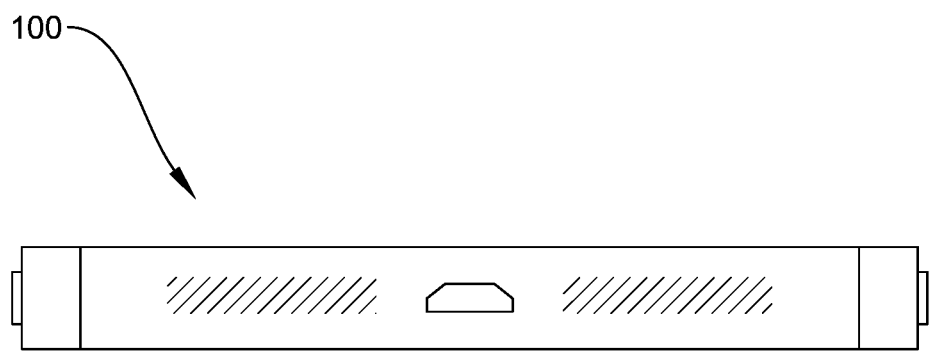

FIGS. 4A and 4B are perspective views of top and bottom views of the proposed double faced electronic device 100, in accordance with the present invention.

The proposed device 100 comprises a reversible camera arrangement in connection with two symmetrically positioned display screens, wherein the camera acting as front camera for the first display screen 101 acts as a rear camera for the second display screen 102, and the camera acting as front camera for the second display screen 102 acts as a rear camera for the first display screen 101. Advantages associated with the proposed device include allowing easier customization of photos, videos and files, facilitating the process of sharing data with multiple social media sites and eliminating the process of juggling between multiple accounts in the same application. Further, the proposed device solves the problem wherein some applications do not allow presence of more than one account on a device, such as WhatsApp. Considering a design aspect of the present invention, the first and second display screens (101 and 102) of the proposed device 100 cover the entire face of the device. Also, as another aspect of the present invention, the first and second display screens (101 and 102) of the proposed device may be connected to each other to share information, if required.

Many changes, modifications, variations and other uses and applications of the subject invention will become apparent to those skilled in the art after considering this specification and the accompanying drawings, which disclose the preferred embodiments thereof. All such changes, modifications, variations and other uses and applications, which do not depart from the spirit and scope of the invention, are deemed to be covered by the invention, which is to be limited only by the claims which follow.

The invention claimed is:

1. An electronic device comprising:
at least two symmetrically positioned display screens on a first and second face of the electronic device, and at least two cameras,
wherein a front camera for the first face functions as a rear camera for the second face, and a front camera for the second face functions as a rear camera for the first face of the electronic device,
wherein independent sets of internal processing electronic components are present for each display screen of the electronic device, which do not interfere with each other, and wherein both the first and the second faces or display screens are controlled by an independent processor, communication line and memory card; and the at least two symmetrically positioned display screens on a first and second face of the electronic device share information with each other wirelessly, however, photos, videos or chat history accessible using the first display screen are not accessible by the second display screen unless a user initiates wireless sharing of the same.

2. The electronic device of claim 1, wherein the symmetrically positioned display screens on the first and second faces of the electronic device are controlled and operatively connected to a plurality of independent electronic processing components.

3. The electronic device of claim 1, wherein the first face of the electronic device is operatively connected with a first baseband module in connection with a first connectivity module and a first memory module.

4. The electronic device of claim 3, wherein the first face of the electronic device is further connected to a first SIM interface, a first RF transceiver, a first RF switch and a first antenna.

5. The electronic device of claim 4, wherein the first face of the electronic device further comprises a first speaker connected with a first user interface module, a first audio module and a first microphone.

6. The electronic device of claim 1, wherein the second face of the electronic device is operatively connected with a second baseband module in connection with a second connectivity module and a second memory module.

7. The electronic device of claim 6, wherein the second face of the electronic device is further connected to a second SIM interface, a second RF transceiver, a second RF switch and a second antenna.

8. The electronic device of claim 7, wherein the second face of the electronic device further comprises a second speaker connected with a second user interface module, a second audio module and a second microphone.

9. The electronic device of claim 1, wherein the symmetrically positioned display screens on the first and second faces of the electronic device are powered using a single battery.

10. The electronic device of claim 9, wherein the battery is a 5000 mAh (milliampere-hour) battery.

11. The electronic device of claim 1, wherein the symmetrically positioned display screens on the first and second faces of the electronic device are charged via a single charging port.

12. The electronic device of claim 1, wherein the symmetrically positioned display screens on the first and second faces of the electronic device are operated simultaneously by a user.

13. The electronic device of claim 1, wherein a plurality of front cameras on the first face functions as a plurality of rear cameras for the second face, and a plurality of front camera for the second face functions as a plurality of rear camera for the first face of the electronic device.

* * * * *